(12) United States Patent
Mori et al.

(10) Patent No.: US 11,802,010 B2
(45) Date of Patent: Oct. 31, 2023

(54) ARTICLE TRANSPORT FACILITY

(71) Applicant: Daifuku Co., Ltd., Osaka (JP)

(72) Inventors: Kiyoji Mori, Hinocho (JP); Atsushi Minoo, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 200 days.

(21) Appl. No.: 17/292,140

(22) PCT Filed: Oct. 24, 2019

(86) PCT No.: PCT/JP2019/041668
§ 371 (c)(1),
(2) Date: May 7, 2021

(87) PCT Pub. No.: WO2020/095698
PCT Pub. Date: May 14, 2020

(65) Prior Publication Data
US 2021/0395025 A1 Dec. 23, 2021

(30) Foreign Application Priority Data
Nov. 9, 2018 (JP) .................................. 2018-211473

(51) Int. Cl.
*B65G 65/00* (2006.01)
*B65G 21/12* (2006.01)
(Continued)

(52) U.S. Cl.
CPC ........... *B65G 65/005* (2013.01); *B65G 21/12* (2013.01); *B65G 61/00* (2013.01); *G01G 19/03* (2013.01); *B65G 2203/0258* (2013.01)

(58) Field of Classification Search
None
See application file for complete search history.

(56) References Cited

U.S. PATENT DOCUMENTS

| 4,104,847 A | * | 8/1978 | Glandon | ................. B65B 35/24 |
| | | | | 53/259 |
| 4,977,999 A | * | 12/1990 | Smock | ..................... B65G 1/08 |
| | | | | 198/861.5 |

(Continued)

FOREIGN PATENT DOCUMENTS

| CN | 203450828 U | 2/2014 |
| JP | 933324 A | 2/1997 |
| TW | 200936471 A | 9/2009 |

*Primary Examiner* — Kavel Singh
(74) *Attorney, Agent, or Firm* — THE WEBB LAW FIRM

(57) ABSTRACT

An article transport facility includes a transport conveyor (34) and a weighing device (24), which includes a support portion (28) for supporting a container (C1) and a measuring portion (30) configured to measure a weight of the container (C1) supported by the support portion (28). The article transport facility is configured to perform a state change between a withdrawn state in which the support portion (28) is withdrawn downward relative to a transport surface (34A) and a protruding state in which the support portion (28) protrudes upward relative to the transport surface (34A) by moving the support portion (28) and the transport conveyor (34) relative to each other in a vertical direction (Z). A support surface (28A) of the support portion (28) is inclined such that one corner portion (8A) of multiple corner portions (8) located at corners of the container (C1) is lower than the other corner portions (8).

21 Claims, 9 Drawing Sheets

(51) Int. Cl.
 *B65G 61/00* (2006.01)
 *G01G 19/03* (2006.01)

(56) References Cited

U.S. PATENT DOCUMENTS 6,252,181 B1 * 6/2001 Fallas .................... G01G 19/03
 177/145
6,705,827 B2 * 3/2004 Keller .................. B25J 15/0616
 414/752.1

* cited by examiner

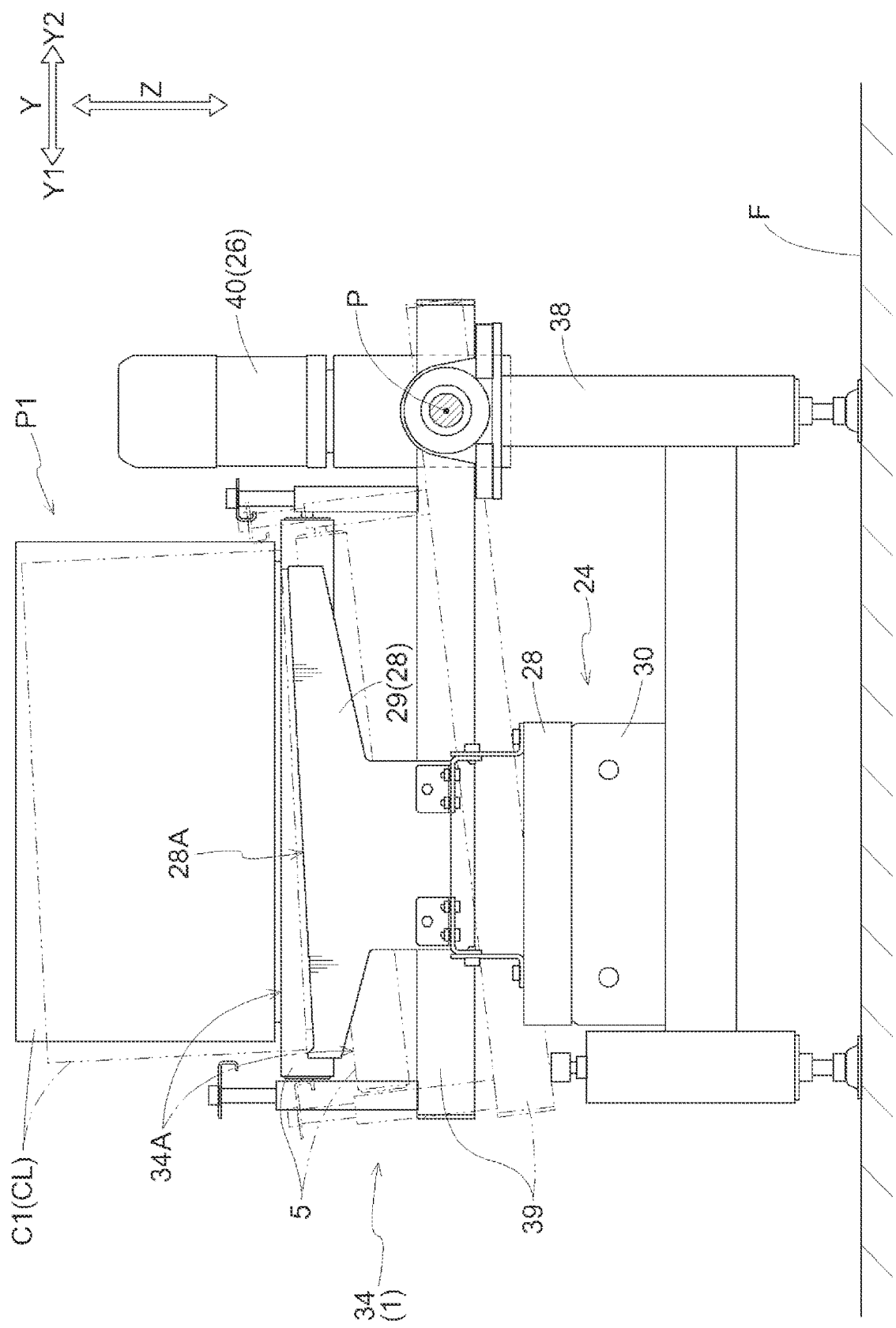

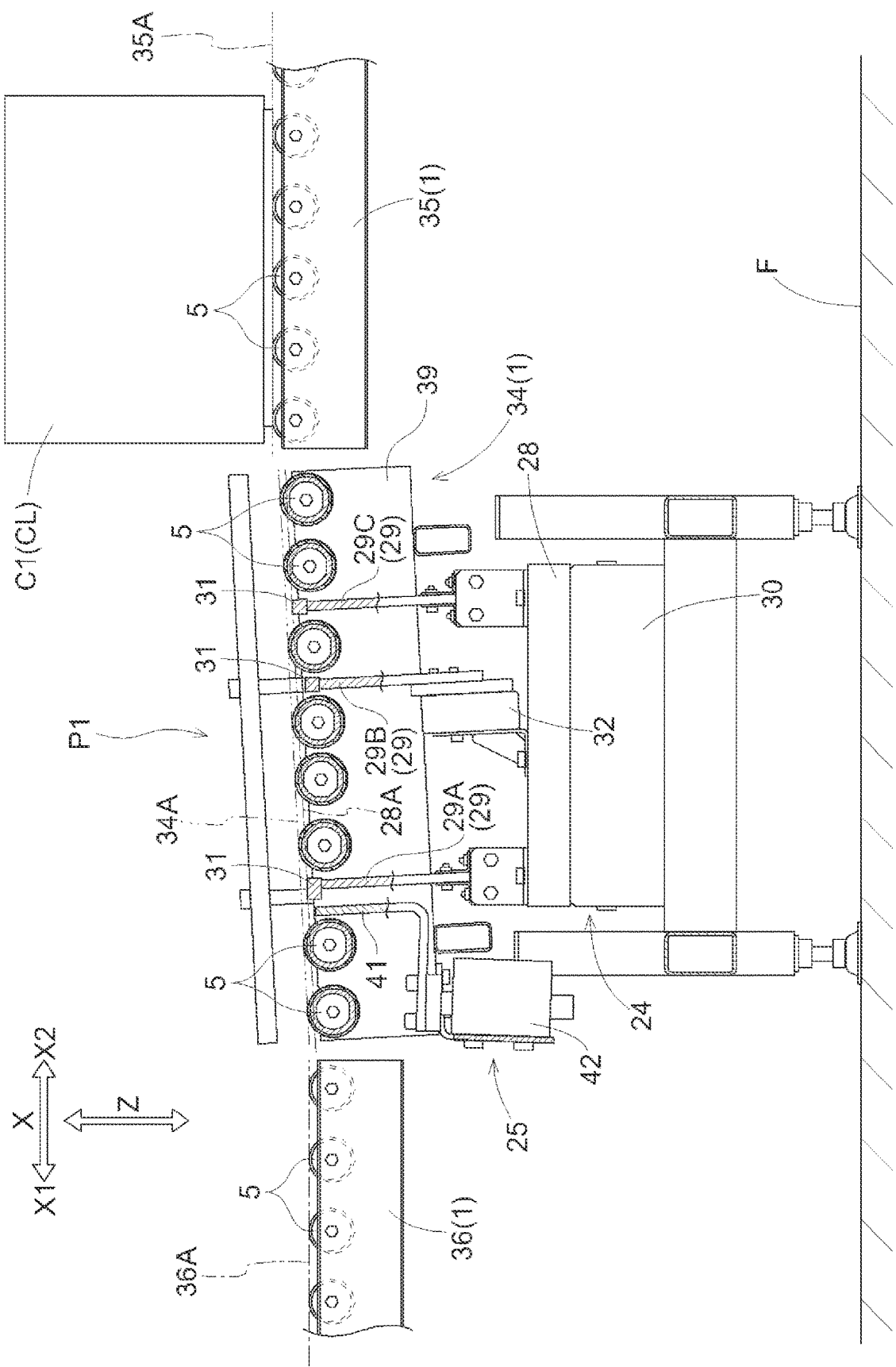

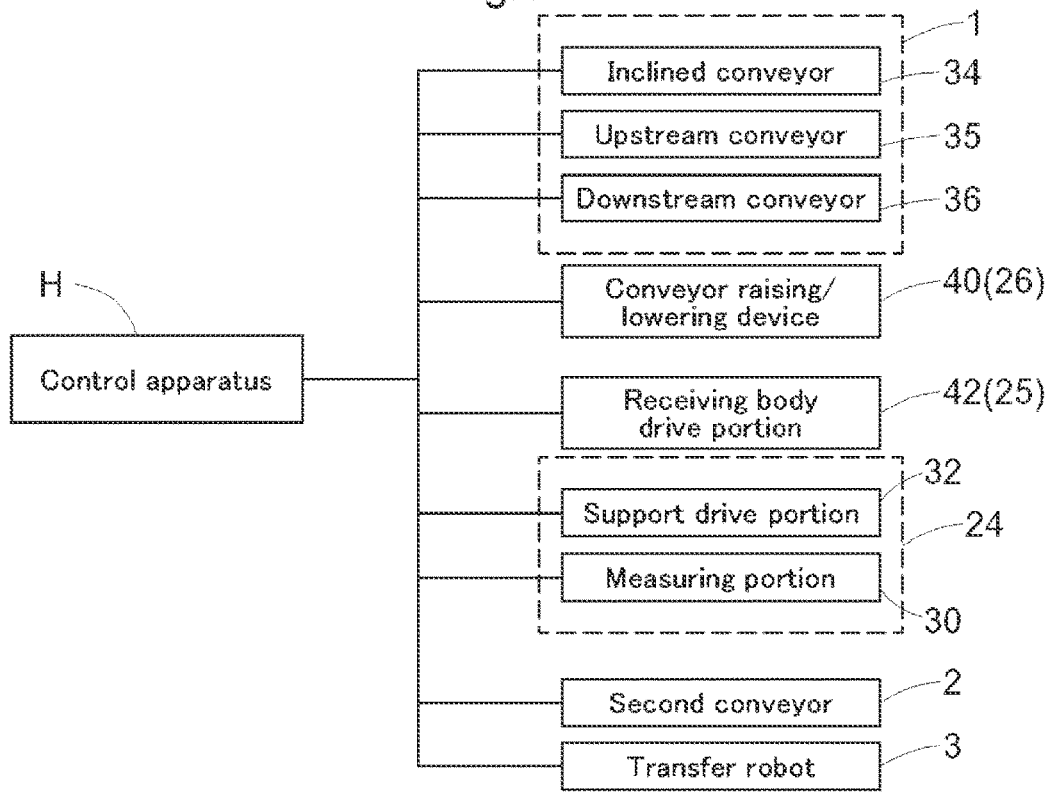
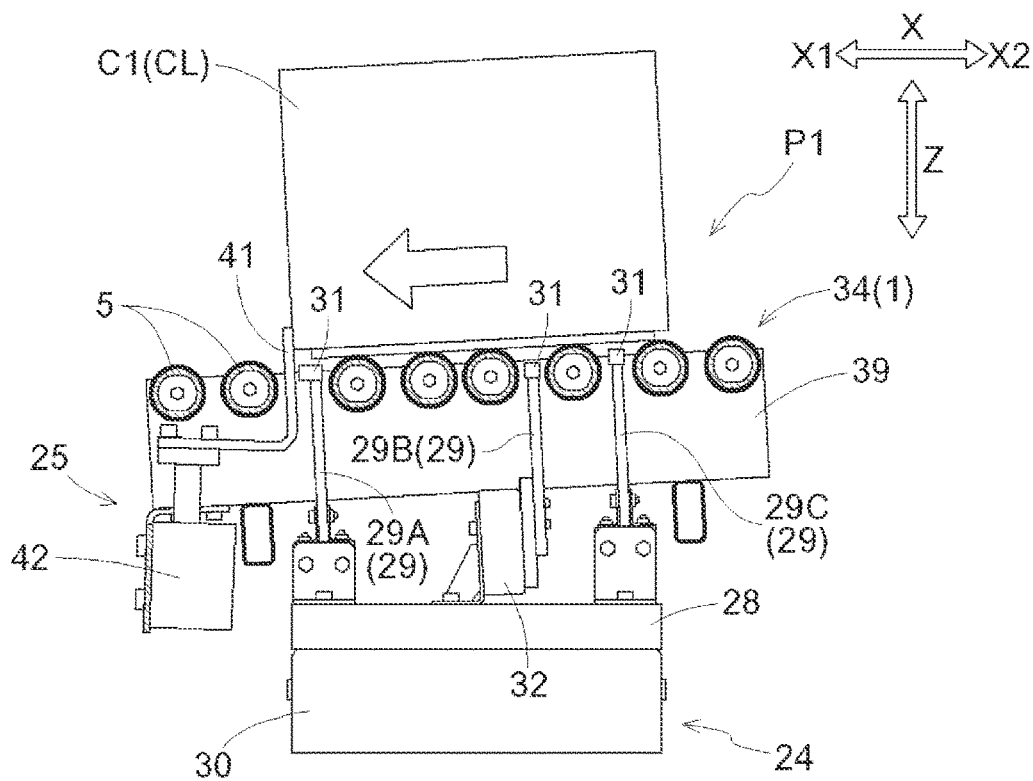

ARTICLE TRANSPORT FACILITY

CROSS-REFERENCE TO RELATED APPLICATIONS

This application is the United States national phase of International Application No. PCT/JP2019/041668 filed Oct. 24, 2019, and claims priority to Japanese Patent Application No. 2018-211473 filed Nov. 9, 2018, the disclosures of which are hereby incorporated by reference in their entirety.

BACKGROUND OF THE INVENTION

1. Field of the Invention

The present invention relates to an article transport facility provided with a transport conveyor for loading and transporting a container storing articles to a transport location, and a weighing device installed at the transport location.

2. Description of the Related Art

Hereinafter, the background art will be described. Hereinafter, in the following description, reference signs or names shown in parentheses are the reference signs or names in the prior art document. As described above, JP H09-033324A discloses an article transport facility provided with a transport conveyor and a weighing device. This article transport facility is configured to be able to, as a result of a transport conveyor moving in the vertical direction, perform a state change between a protruding state in which a support portion (base portion 23) of the weighing device (weight measuring device 19) protrudes upward relative to a transport surface (upper surface a) of the transport conveyor (conveyor 13) and a withdrawn state in which the support portion is withdrawn downward relative to the transport surface of the transport conveyor. Then, after the container is transported to the transport location by the transport conveyor, the transport conveyor is lowered, and the state of the weighing device is switched from the withdrawn state to the protruding state. Accordingly, the support portion of the weighing device supports the container, and the weight of the container can be measured by the weighing device.

Patent Document 1: JP H09-033324A

SUMMARY OF THE INVENTION

However, in the above-described article transport facility, when the weight of the container is measured by the weighing device, there are cases where the stacked state of multiple articles stored in the container is disrupted. In particular, as described above, when a transfer robot or an operator performs an operation of retrieving an article from the container or storing an article in the container in a state in which the weight of the container is being measured by the weighing device, there are cases where the stacked state of the articles stored in the container is disrupted. There is a possibility that if the stacked state of the articles is disrupted during such an operation, problems such as a decrease in the operation efficiency due to the operation being interrupted may arise, for example.

In view of this, there is demand for the realization of an article transport facility capable of making the stacked state of articles unlikely to be disrupted in a container supported by a support portion of a weighing device.

In view of the foregoing, an article transport facility according to a characteristic configuration includes a transport conveyor configured to load and transport a container storing articles to a transport location, and a weighing device installed at the transport location, in which the weighing device includes a support portion for supporting the container and a measuring portion configured to measure a weight of the container supported by the support portion, the article transport facility is configured to be able to perform a state change between a withdrawn state in which the support portion is withdrawn downward relative to a transport surface of the transport conveyor and a protruding state in which the support portion protrudes upward relative to the transport surface, by moving the support portion and the transport conveyor relative to each other in a vertical direction, and a support surface of the support portion for supporting the container is inclined such that one of a plurality of corner portions located at corners of the container is lower than the other corner portions in a view along the vertical direction.

According to this characteristic configuration, after the container is transported by the transport conveyor to the transport location, the container supported by the transport conveyor can be supported by the support portion of the weighing device by changing the relationship between the transport device and the weighing device from the withdrawn state to the protruding state. Therefore, it is possible to measure the weight of the container using the weighing device. Also, the container supported by the support portion is in an orientation in which one of the multiple corner portions located at the corners of the container is lower than the other corner portions. As a result of the container being supported by a support body in such an orientation, articles stored in the container lean against a side wall portion of the container or the adjacent other articles, and thus the articles stored in the container are unlikely to collapse.

BRIEF DESCRIPTION OF THE DRAWINGS

FIG. 4 is a front view of an inclined conveyor.
FIG. 5 is a side view of the inclined conveyor.
FIG. 6 is a control block diagram.
FIG. 7 is a side view of the inclined conveyor in which a large container is supported by a conveyor portion.

DETAILED DESCRIPTION OF PREFERRED EMBODIMENTS

1. Embodiment

Figure 1:
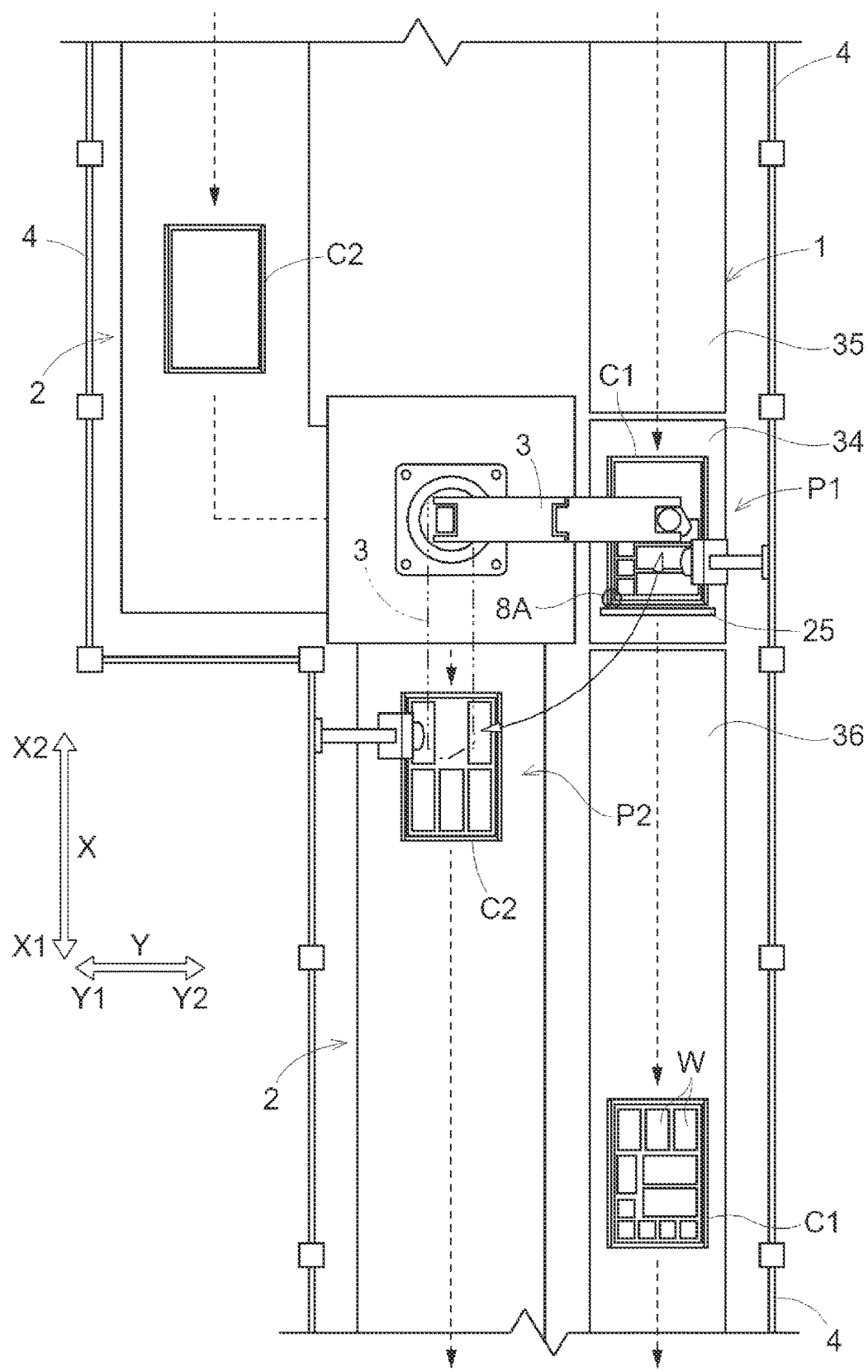
FIG. 1 is a plan view of an article transport facility.

An embodiment of an article transport facility will be described with reference to the drawings. As shown in FIG. 1, the article transport facility includes a first conveyor 1 that transports a first container C1, a second conveyor 2 that transports a second container C2, a transfer robot 3 that transfers articles W from the first container C1 to the second container C2, and a fence 4 that encloses an installation region where the first conveyor 1, the second conveyor 2, and the transfer robot 3 are installed.

As shown in FIG. 5, the first conveyor 1 is a roller conveyor provided with a plurality of rollers 5 that transport the first container C1 along a transport direction X, and as indicated by dotted arrows in FIG. 1, the first conveyor 1 transports the first container C1 in one direction. A first transport location P1 is set along the transport path of the first conveyor 1. The first conveyor 1 transports the first container C1 from a first transport start point (not shown) to the first transport location P1, and transports the first container C1 from the first transport location P1 to a first transport destination (not shown). One or more articles W are stored in the first container C1 that is transported by the first conveyor 1 to the first transport location P1. Multiple articles W of the same type are stored in one first container C1, for example. Note that the first container C1 corresponds to a container in which the articles W are stored, and the first transport location P1 corresponds to the transport location.

Similarly to the first conveyor 1, the second conveyor 2 is a roller conveyor, and as indicated by arrows in FIG. 1, the second conveyor 2 transports the second container C2 in one direction. A second transport location P2 is set along the transport path of the second conveyor 2. The second conveyor 2 transports the second container C2 from a second transport start point (not shown) to the second transport location P2. Also, the second conveyor 2 transports the second container C2 from the second transport location P2 to the second transport start point (not shown). Although no article W is stored in the second container C2 that is transported by the second conveyor 2 to the second transport location P2, one or multiple articles W of one type transferred by the transfer robot 3 or multiple articles W of multiple types are stored in the second container C2 that is transported from the second transport location P2.

In the article transport facility, the first container C1 storing the articles W is transported by the first conveyor 1 to the first transport location P1, and the empty second container C2 is transported by the second conveyor 2 to the second transport location P2. Then, the transfer robot 3 retrieves an article W from the first container C1 at the first transport location P1, and transfers the article W from the first container C1 to the second container C2 so as to store the retrieved article W in the second container C2 at the second transport location P2. The first container C1 from which all the articles W to be retrieved have been retrieved is transported from the first transport location P1 by the first conveyor 1. Also, the second container C2 in which all the articles W to be stored have been stored is transported from the second transport location P2 by the second conveyor 2.

Figure 2:
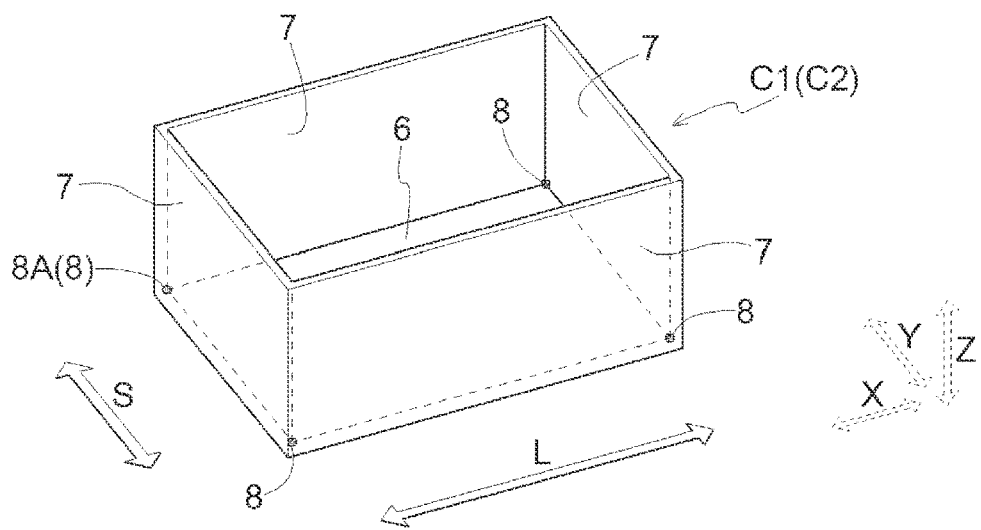
FIG. 2 is a perspective view of a first container.

As shown in FIG. 2, the first container C1 has a loading portion 6 (bottom portion) on which the article W is loaded, and side wall portions 7 that extend upward from a peripheral edge portion of the loading portion 6, and the first container C1 is formed into a box shape with an open upper surface. In this embodiment, the loading portion 6 is formed into a rectangular shape in a view along a vertical direction Z. The first container C1 has four corner portions 8 located at the corners of the first container C1 in the view along the vertical direction Z. Here, one of the four corner portions 8 will be referred to as the "target corner portion 8A". Note that the target corner portion 8A corresponds to one of the multiple corner portions 8, and three corner portions 8 other than the target corner portion 8A correspond to the other corner portions 8. Also, in this embodiment, the first container C1 includes a large container CL (see FIGS. 7 to 14), and a small container CS (see FIG. 15) in which the width in a longer direction L and the width in a shorter direction S are smaller than those of the large container CL.

Figure 3:
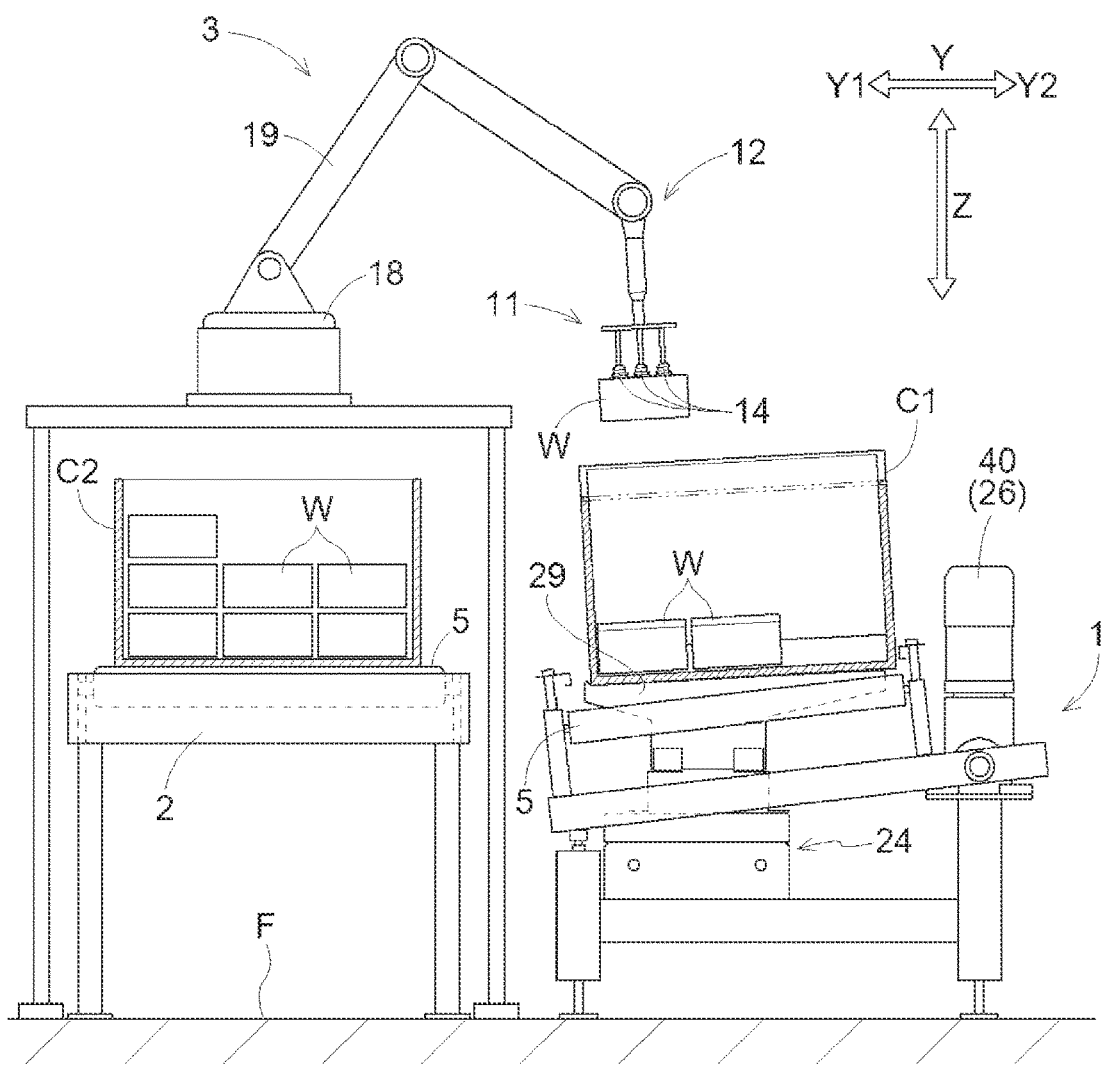
FIG. 3 is a front view of the article transport facility.

As shown in FIG. 3, the transfer robot 3 includes a holding portion 11 for holding an upper surface of the article W and a moving mechanism 12 for moving the holding portion 11. The moving mechanism 12 includes a rotating portion 18 that rotates around a rotation axial center extending in the vertical direction Z and a multi-articulated arm 19, and the position and orientation of the holding portion 11 are changed by rotating the rotating portion 18 and bending and extending the multi-articulated arm 19.

The holding portion 11 includes a plurality of suction pads 14. In this embodiment, the holding portion 11 includes three suction pads 14. The holding portion 11 holds the article W by causing at least one or all of the multiple suction pads 14 to suction the upper surface of the article W.

As shown in FIG. 5, the article transport facility includes a weighing device 24 (see FIG. 9 and the like) for measuring the weight of the first container C1 at the first transport location P1, and a receiving portion 25 (see FIG. 7 and the like) for receiving the container transported to the first transport location P1. The receiving portion 25 is installed on a downstream side X1 in the transport direction relative to the support portion 28. The receiving portion 25 comes into contact with the first container C1 transported by the inclined conveyor 34 of the first conveyor 1, and stops the first container first container C1 in a predetermined orientation at the first transport location P1 (see FIG. 7 and the like).

In this embodiment, as shown in FIG. 1, "predetermined orientation" refers to the orientation of the first container C1, in which the longer direction L of the first container C1 extends in the transport direction X of the first conveyor 1. Therefore, at the first transport location P1, the first container C1 is located in an orientation in which the longer direction L extends in the transport direction X of the first conveyor 1 and the shorter direction S extends in a width direction Y of the first conveyor 1. Also, the corner portion 8 located on the downstream side X1 in the transport direction and on a first side Y1 in the width direction will be referred to as the "target corner portion 8A" in the first container C1 at the first transport location P1.

As shown in FIG. 4, the article transport facility further includes a state changing portion 26 for performing a state change between the withdrawn state (the state indicated by a broken line) in which a support portion 28 (the support surface 28A of the support portion 28) is withdrawn downward relative to a first transport surface 34A, which is a transport surface of the inclined conveyor 34 and the protruding state (the state indicated by a solid line) in which the support portion 28 protrudes upward relative to the first transport surface 34A, by moving the inclined conveyor 34 of the first conveyor 1 and the support portion 28 of the weighing device 24 relative to each other in the vertical direction Z. Hereinafter, the weighing device 24, the receiving portion 25, and the state changing portion 26 will be described, in addition to the description of the first conveyor 1.

The weighing device 24 is installed at the first transport location P1. As shown in FIGS. 4 and 5, the weighing device 24 includes the support portion 28 for supporting the first container C1 and a measuring portion 30 for measuring the weight of the first container C1 supported by the support portion 28. The measuring portion 30 is installed in a horizontal orientation. The support portion 28 includes a plurality of supports 29 that are arranged side-by-side in the transport direction X. The supports 29 are each disposed between two rollers 5 that are adjacent to each other in the transport direction X. In this embodiment, the support portion 28 includes three supports 29, namely, a first support 29A, a second support 29B located on the upstream side X2 in the transport direction relative to the first support 29A, and a third support 29C located on the upstream side X2 in the transport direction relative to the second support 29B.

Here, a virtual surface obtained by connecting upper end portions 31 of the plurality of supports 29 will be referred to as the "support surface 28A". The support surface 28A of the support portion 28 that supports the first container C1 is inclined downward toward the downstream side X1 in the transport direction (see FIG. 5), and is inclined downward toward the first side Y1 in the width direction (see FIG. 4). That is, although the measuring portion 30 is not inclined, the support surface 28A is inclined such that, out of the four corner portions 8 of the first container C1, the target corner portion 8A is lower than the other three corner portions 8. In this embodiment, the support surface 28A supports the first container C1 such that the target corner portion 8A is lower than all the other corner portions 8. In this embodiment, the support surface 28A is inclined at an angle of several degrees in both the transport direction X and the width direction Y. Also, in this example, the inclination angle of the transport direction X and the inclination angle of the width direction Y are the same.

Out of the plurality of supports 29, upper end portions 31 of supports 29 other than the supports 29 located on two end portions in the transport direction X are configured to be able to retract downward relative to the support surface 28A. In this embodiment, an upper end portion 31 of the second support 29B is configured to be able to retract downward relative to the support surface 28A. In addition, as shown in FIG. 5, the second support 29B includes a support drive portion 32 for moving the upper end portion 31 along the vertical direction Z. In this embodiment, the support drive portion 32 has an electric motor and a linking mechanism for causing the rotation shaft of the electric motor and the upper end portion 31 to move in a linked manner. The second support 29B is configured to, by moving the upper end portion 31 in the vertical direction Z with use of the support drive portion 32, move the upper end portion 31 to a support position (see FIG. 15) where the upper surface of the upper end portion 31 is located on the same plane as the support surface 28A and a support retracting position (see FIGS. 7 to 11) where the upper end portion 31 is retracted downward relative to the support surface 28A. That is, the second support 29B is configured such that the upper end portion 31 is retracted downward relative to the support surface 28A, by moving the upper end portion 31 from the support position to the support retracting position.

Figure 15:
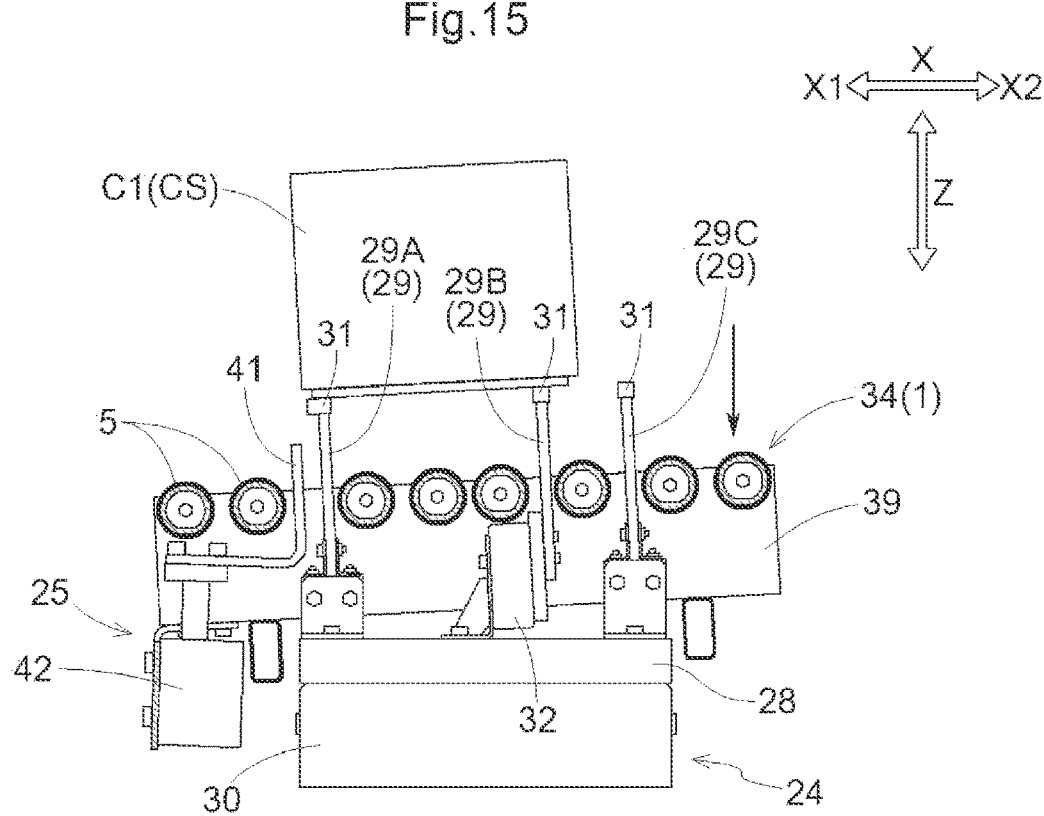
FIG. 15 is a side view of the inclined conveyor in which a small container is supported by the support portion.

As shown in FIGS. 7 to 11, with the large container CL received by the receiving portion 25, an end portion of the bottom surface thereof on the upstream side X2 in the transport direction is located on the upstream side X2 in the transport direction relative to the upper end portion 31 of the third support 29C. Therefore, the support portion 28 supports the large container CL using the first support 29A and the third support 29C in a state in which the second support 29B is located at the support retracting position. That is, the support portion 28 supports the large container CL using the two supports 29 located at the two end portions in the transport direction X. Also, as shown in FIG. 15, with the small container CS received by the receiving portion 25, an end portion of the bottom surface thereof on the upstream side X2 in the transport direction is located between the upper end portion 31 of the second support 29B and the upper end portion 31 of the third support 29C in the transport direction X. Therefore, the support portion 28 supports the small container CS using the first support 29A and the second support 29B in a state in which the second support 29B is located at the support position. That is, the support portion 28 supports the small container CS using the support 29 located at an end portion on the downstream side X1 in the transport direction X and the support 29 located at an intermediate position in the transport direction X. The receiving portion 25 is configured to support the first container C1 using a plurality of supports 29 in this manner.

As shown in FIG. 5, the first conveyor 1 includes an inclined conveyor 34 (a first transport conveyor), an upstream conveyor 35 (a second transport conveyor), and a downstream conveyor 36 (a third transport conveyor). The inclined conveyor 34 is installed at the first transport location P1, and the first transport surface 34A of the inclined conveyor 34 is inclined downward toward the downstream side X1 in the transport direction. The upstream conveyor 35 is installed in a state in which it is adjacent to the inclined conveyor 34 on the upstream side X2 in the transport direction so as to pass the first container C1 to the inclined conveyor 34. The downstream conveyor 36 is installed in a state in which it is adjacent to the inclined conveyor 34 on the downstream side X1 in the transport direction so as to receive the first container C1 from the inclined conveyor 34. A second transport surface 35A, which is a transport surface of the upstream conveyor 35, is located above a third transport surface 36A, which is a transport surface of the downstream conveyor 36, and the second transport surface 35A and the third transport surface 36A are horizontal. Note that the inclined conveyor 34 corresponds to a transport conveyor for loading and transporting a container to a transport location. Also, in the first conveyor 1, the upstream conveyor 35 and the inclined conveyor 34 may transport the first container C1 from the first transport start point (not shown) to the first transport location P1, the inclined conveyor 34 and the downstream conveyor 36 may transport the first container C1 from the first transport location P1 to the first destination (not shown), and the inclined conveyor 34 (the first transport conveyor) may be a conveyor where the first transport location P1 is located.

As shown in FIG. 4, the inclined conveyor 34 includes a base portion 38 installed on a floor surface F, a conveyor portion 39 supported by the base portion 38 swingably around an axial center P extending along the transport direction X, and a conveyor raising/lowering device 40 for raising/lowering the conveyor portion 39 by swinging the conveyor 39 around the axial center P. The conveyor portion 39 is provided with a plurality of rollers 5 along the transport direction X, and the inclined conveyor 34 loads and transports the first container C1 by the conveyor portion 39.

As shown in FIGS. 4, and 12 to 14, the inclined conveyor 34 is configured to be able to change the inclination angle of the first transport surface 34A relative to the width direction Y by moving an end portion of the first transport surface 34A located on the first side Y1 in the width direction in the vertical direction Z relative to an end portion thereof on the second side Y2 in the width direction. More specifically, the conveyor portion 39 is supported by the base portion 38 swingably around the axial center P extending along the transport direction X, and the inclined conveyor 34 changes the inclination angle of the first transport surface 34A relative to the width direction Y by swinging the conveyor portion 39 around the axial center P with use of the conveyor raising/lowering device 40. In this embodiment, a configuration is adopted in which the inclination angle of the first transport surface 34A relative to the width direction Y can be changed between an angle at which the first transport surface 34A is horizontal in the width direction Y (at an inclination angle of 0 degrees, see the solid line in FIG. 4 and FIG. 12) and an angle that is larger than the inclination angle of the support surface 28A relative to the width direction Y (see the virtual line in FIG. 4 and FIG. 14).

As described above, by swinging the conveyor portion 39 downward using the conveyor raising/lowering device 40, the support portion 28 (the upper end portion 31 of the support 29) enters the protruding state in which the upper end portion 31 protrudes upward relative to the first transport surface 34A of the inclined conveyor 34, and by swinging the conveyor portion 39 upward using the conveyor raising/lowering device 40, the support portion 28 (the upper end portion 31 of the support 29) enters the withdrawn state in which the upper end portion 31 is withdrawn downward relative to the first transport surface 34A. In this embodiment, the conveyor raising/lowering device 40 functions as the state changing portion 26 that raises and lowers the conveyor portion 39 in the vertical direction Z by swinging the conveyor portion 39 around the axial center P using a drive force of the electric motor, and that performs a state change between the withdrawn state and the protruding state.

Figure 8:
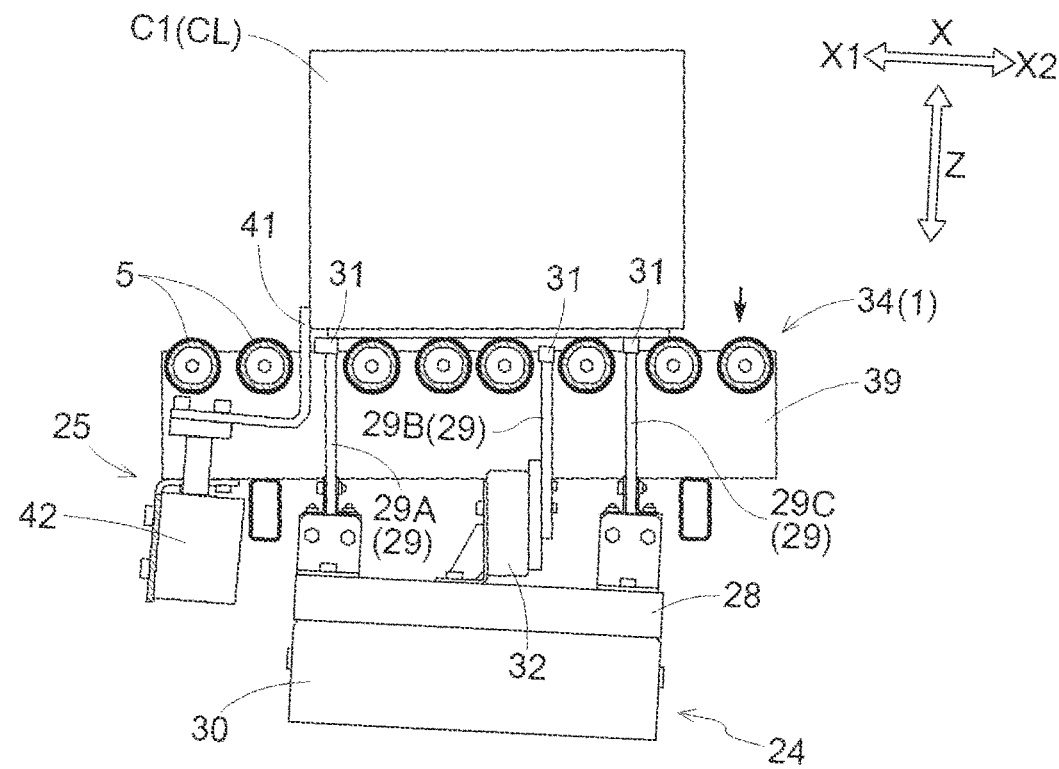
FIG. 8 is a side view of the inclined conveyor in which the large container is supported by the conveyor portion and the support portion.
Figure 9:
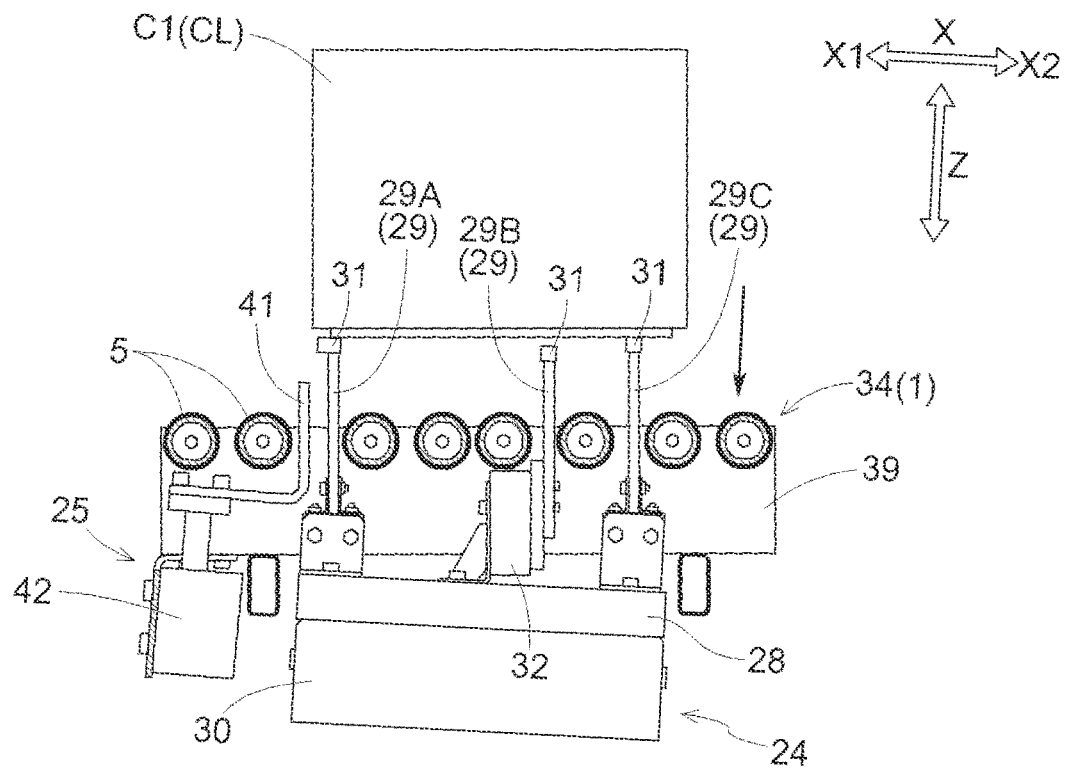
FIG. 9 is a side view of the inclined conveyor in which the large container is supported by the support portion.
Figure 12:
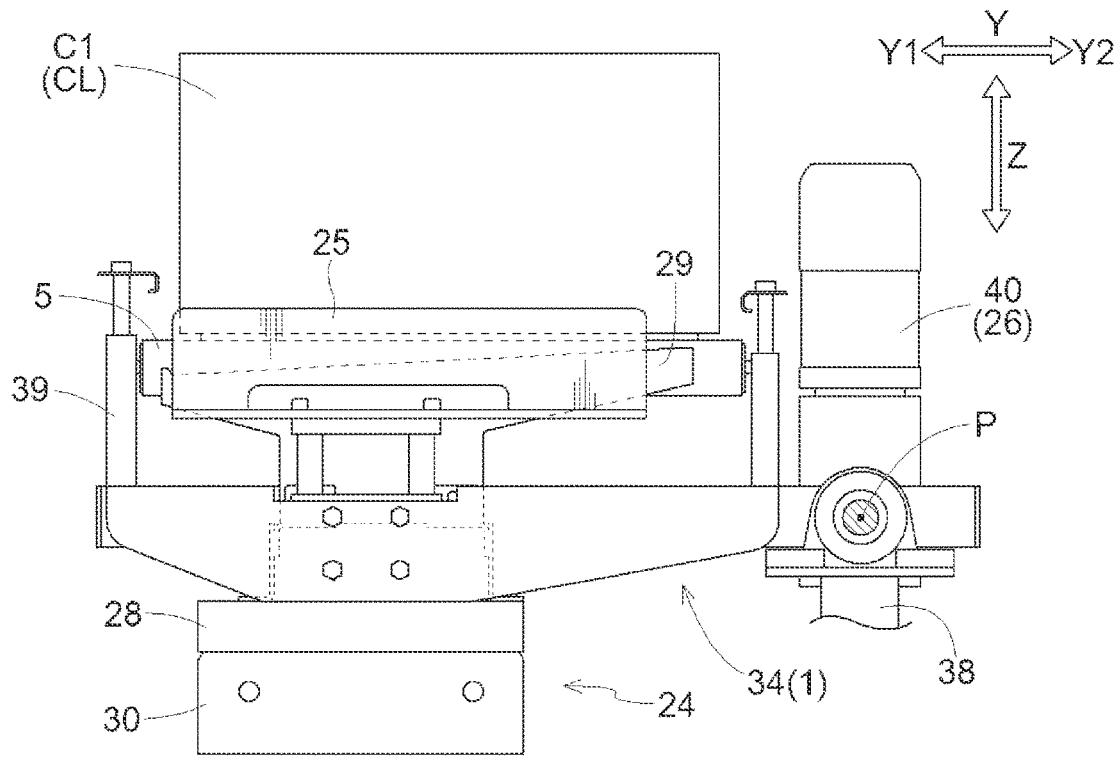
FIG. 12 is a front view of the inclined conveyor in which the large container is supported by the conveyor portion.
Figure 13:
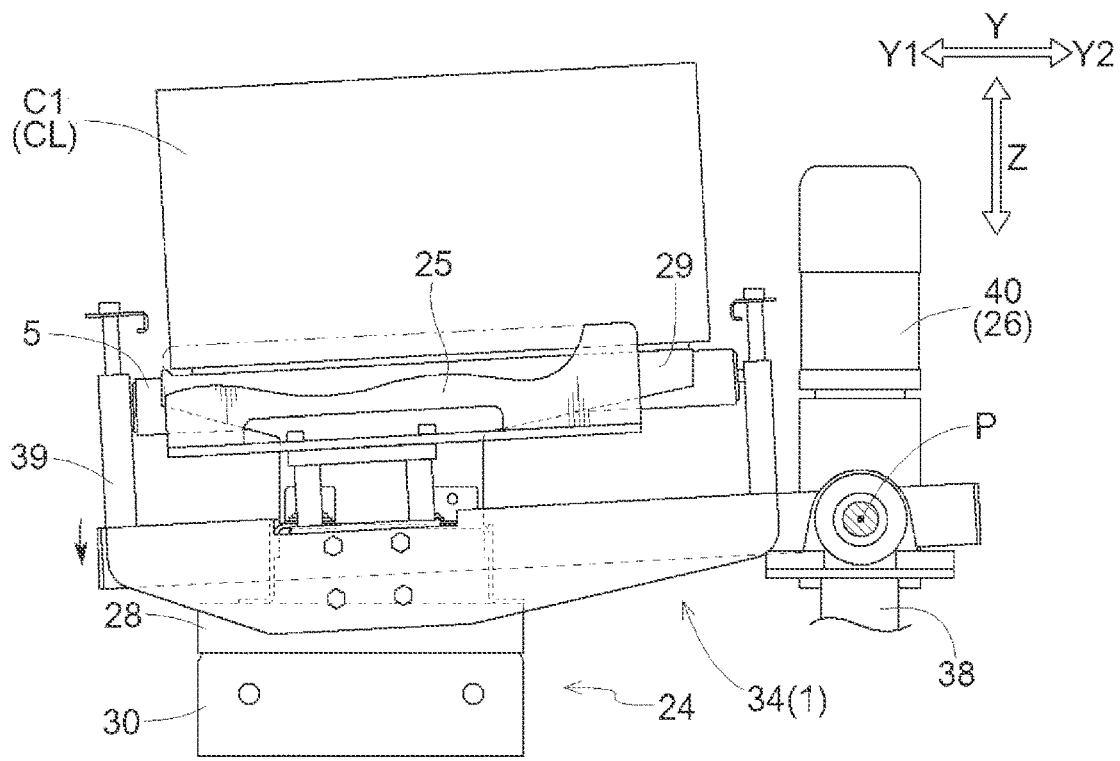
FIG. 13 is a front view of the inclined conveyor in which the large container is supported by the conveyor portion and the support portion.
Figure 14:
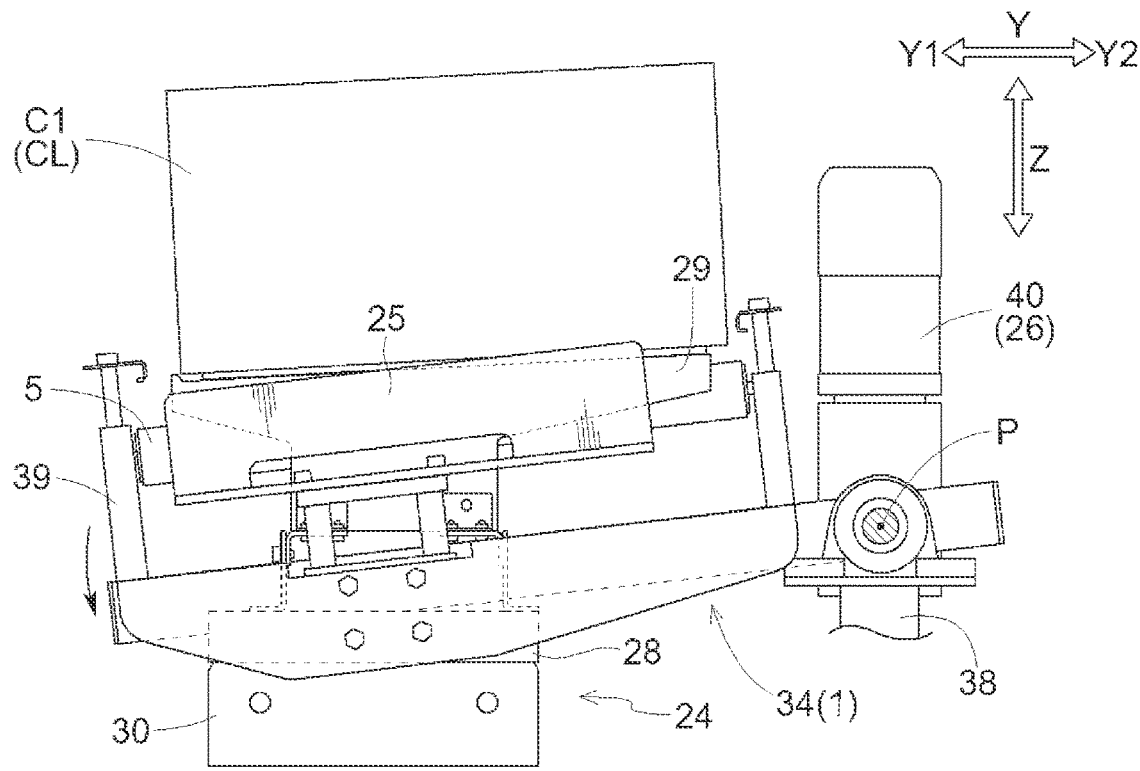
FIG. 14 is a front view of the inclined conveyor in which the large container is supported by the support portion.

Also, in this embodiment, a state is passed through in which the first transport surface 34A and the support surface 28A are located on the same plane (see FIG. 13) while a state change is performed between the withdrawn state and the protruding state. That is, as shown in FIGS. 7 and 12, the first container C1 is supported only by the conveyor portion 39 out of the conveyor portion 39 and the support 29 (the support portion 28) in the withdrawn state. As shown in FIGS. 8 and 13, while a state change is performed from such a withdrawn state to the protruding state, the first transport surface 34A and the support surface 28A are located on the same plane, and the first container C1 is supported by both the conveyor portion 39 and the support 29. Furthermore, as shown in FIGS. 9 and 14, by changing the state to the withdrawn state, the first container C1 is supported only by the support 29 out of the conveyor portion 39 and the support 29.

As shown in FIG. 5, the receiving portion 25 includes a receiving body 41 installed on the downstream side X1 in the transport direction relative to the plurality of supports 29, and a receiving body drive portion 42 for moving the receiving body 41 in the vertical direction Z. The receiving portion 25 is supported by the conveyor portion 39, and moves in the vertical direction Z together with the conveyor portion 39 due to the conveyor portion 39 swinging around the axial center P. Also, the receiving portion 25 is configured to move the receiving body 41 to a receiving/retracting position (see FIGS. 10 and 11) where the receiving body 41 is withdrawn downward relative to the first transport surface 34A and to a receiving position (see FIGS. 7 to 9) where the receiving body 41 protrudes upward relative to the first transport surface 34A, by moving the receiving body 41 in the vertical direction Z with respect to the conveyor portion 39 with use of the receiving body drive portion 42.

As shown in FIG. 6, the article transport facility is provided with a control apparatus H that controls the first conveyor 1, the second conveyor 2, the transfer robot 3, the weighing device 24, the receiving portion 25, and the state changing portion 26.

As shown in FIG. 7, the control apparatus H stops the transportation operation of the conveyor portion 39 when a set time has passed after the first container C1 has been transported to the first transport location P1. Because the first container C1 is pressed against the receiving body 41 by continuing the transportation operation of the conveyor portion 39 only for a set time after the first container C1 has been transported to the first transport location P1 in this manner, even if the first container C1 is transported to the first transport location P1 in an inclined orientation in the view along the vertical direction Z with respect to the predetermined orientation, the orientation of the first container C1 can be corrected to the predetermined orientation. When the first container C1 is transported to the first transport location P1 in this manner, the relationship between the conveyor portion 39 and the support portion 28 is set to the withdrawn state, and the receiving body 41 is set at the receiving position.

Then, as shown in FIGS. 7 to 9, and 12 to 14, the control apparatus H controls the conveyor raising/lowering device 40 so as to switch the relationship between the conveyor portion 39 and the support portion 28 from the withdrawn state to the protruding state. As shown in FIGS. 8 and 13, a state is passed through in which the first transport surface 34A and the support surface 28A are located on the same plane, while a state change is performed in this manner. Incidentally, at this time, if the first container C1 at the first transport location P1 is the large container CL, a change to the protruding state is made with the second support 29B set at the support retracting position, whereas if the first container C1 at the first transport location P1 is the small container CS, a change to the protruding state is made with the second support 29B set at the support position.

Figure 10:
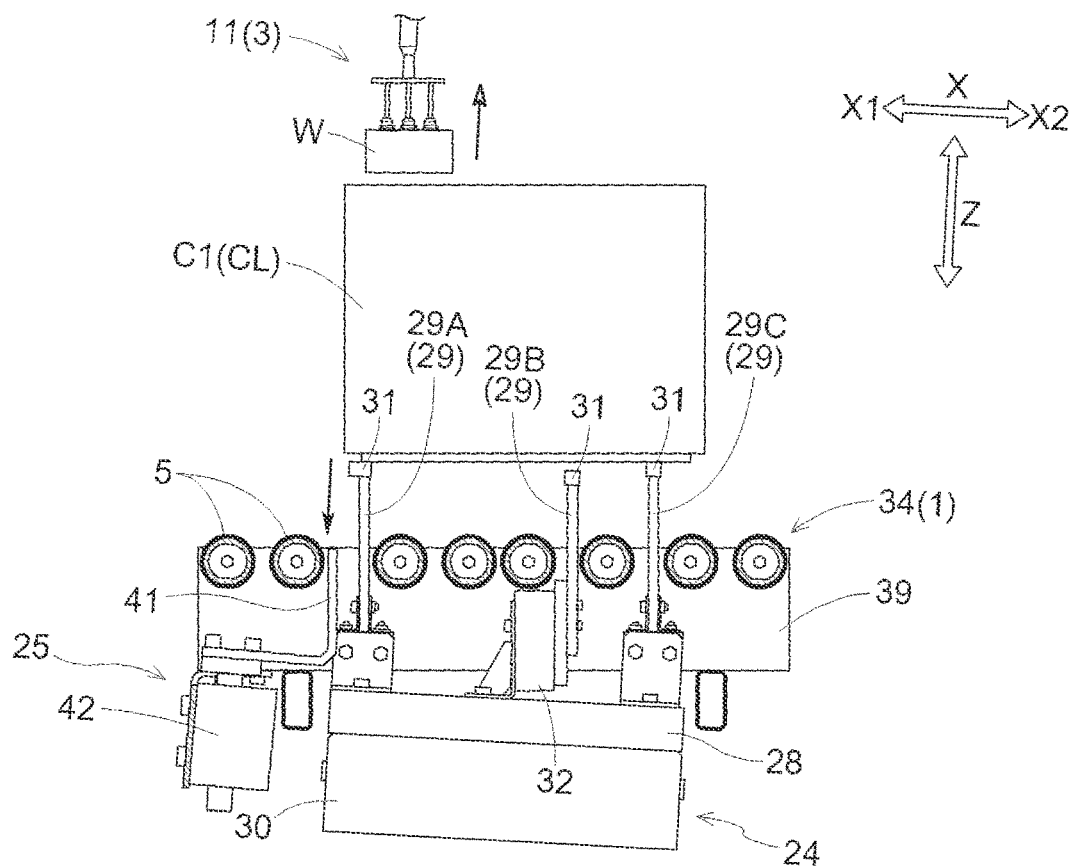
FIG. 10 is a side view of the inclined conveyor in which the large container is supported by the support portion.

Then, as shown in FIG. 10, the control apparatus H moves the receiving body 41 from the receiving position to the receiving/retracting position. The transfer robot 3 is controlled such that the article W is retrieved from the first container C1 by the transfer robot 3 when the relationship between the conveyor portion 39 and the support portion 28 is in the protruding state and the receiving body 41 is located at the receiving/retracting position. At this time, the control apparatus H checks whether or not the article W is appropriately retrieved from the first container C1 by the transfer robot 3 based on information regarding weighing made by the weighing device 24 and information regarding the weight of the article W to be retrieved. Then, even though the transfer robot 3 has retrieved the article W, if the weight indicated by the weighing information does not decrease by an amount corresponding to the weight indicated by information regarding the weight of the article W to be retrieved, the control apparatus H determines that there is an abnormality, and re-executes the transfer of the article W using the transfer robot 3, or issues a notification about the abnormality.

Figure 11:
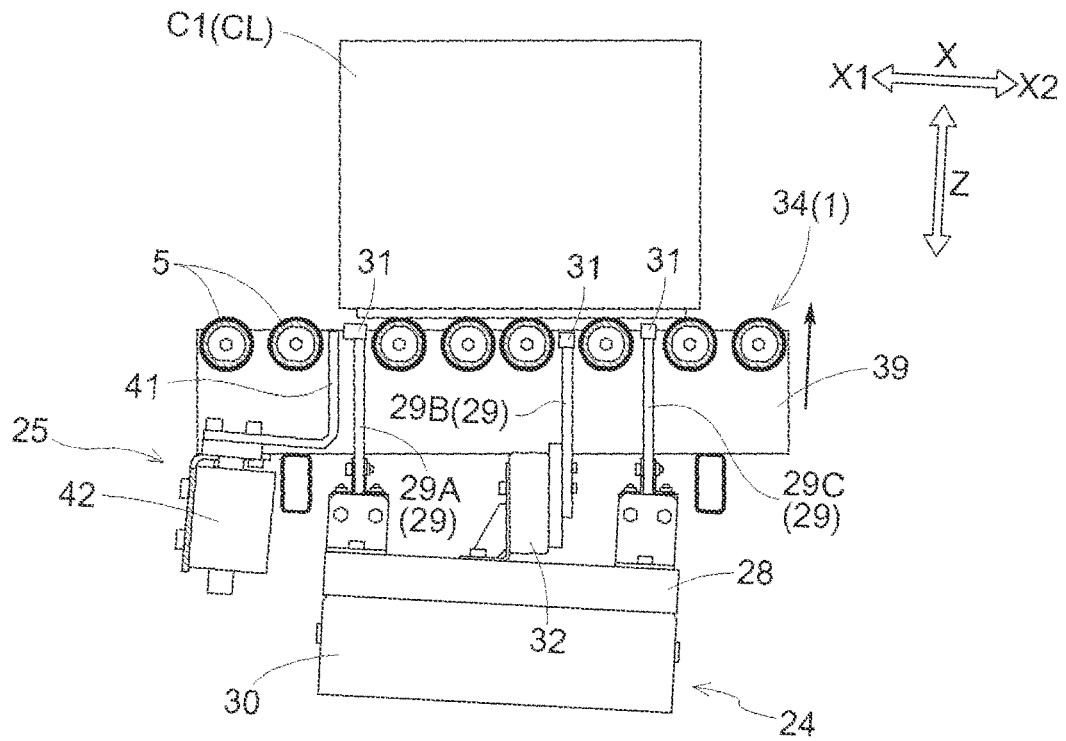
FIG. 11 is a side view of the inclined conveyor in which the large container is supported by the conveyor portion.

After the article W to be retrieved has been retrieved from the first container C1 by the transfer robot 3, as shown in FIG. 11, the control apparatus H changes the relationship between the conveyor portion 39 and the support portion 28 to the withdrawn state, and then, controls the first conveyor 1 so as to transport the first container C1 from the first transport location P1. Then, after the first container C1 has been transported from the first transport location P1, as shown in FIG. 7, the control apparatus H controls the receiving body drive portion 42 so as to move the receiving body 41 from the receiving/retracting position to the receiving position.

2. Other Embodiments

Next, other embodiments of the article transport facility will be described.

(1) Although a state change was performed between the withdrawn state and the protruding state by swinging the inclined conveyor 34 around the axial center P in the above-described embodiment, the method for changing the state between the withdrawn state and the protruding state is not limited thereto. That is, a state change may be performed between the withdrawn state and the protruding state by moving the inclined conveyor 34 in the vertical direction Z without swinging the inclined conveyor 34. Also, a state change may be performed between the withdrawn state and the protruding state using the state changing portion 26 as a support raising/lowering device for raising and lowering the support portion 28 in the vertical direction Z, and moving the support portion 28 in the vertical direction Z with use of the support raising/lowering device.

(2) Although the article W was retrieved by the transfer robot 3 from the first container C1 supported by the weighing device 24 in the above-described embodiment, a configuration may be adopted in which the weighing device 24 is installed at the second transport location P2 and the article W is stored by the transfer robot 3 to the second container C2 supported by the weighing device 24. Also, a configuration may be adopted in which an operator retrieves the article W from the first container C1 supported by the weighing device 24, or an operator stores the article W in the second container C2 supported by the weighing device 24.

(3) Although the inclined conveyor 34 is configured to transport the first container C1 to the first transport location P1 in a state in which the first transport surface 34A is inclined in the transport direction X in the above-described embodiment, the inclined conveyor 34 may be configured to transport the first container C1 to the first transport location P1 in a state in which the first transport surface 34A is horizontal in the transport direction X. Note that the inclined conveyor 34 may be configured to tilt the first transport surface 34A in the transport direction X after the first container C1 is transported to the first transport location P1 in this case. Also, although the inclined conveyor 34 is configured to transport the first container C1 to the first transport location P1 in a state in which the first transport surface 34A is horizontal in the width direction Y, the inclined conveyor 34 may be configured to transport the first container C1 to the first transport location P1 in a state in which the first transport surface 34A is inclined in the width direction Y.

(4) Although the inclined conveyor 34 is a roller conveyor in the above-described embodiment, the inclined conveyor 34 may be another type of conveyor such as a chain conveyor or a belt conveyor.

(5) Although a configuration was adopted in which the weights of two types of first containers C1 having different sizes, such as the large container CL and the small container CS, are measured by the weighing device 24 in the above-described embodiment, a configuration may be adopted in which the weights of only one type of first containers C1 are measured by the weighing device 24, or a configuration may be adopted in which three or more types of first containers C1 having different sizes are measured thereby.

(6) Note that the configurations disclosed in any of the above-described embodiments can be applied in combination with the configurations disclosed in another embodiment as long as no contradiction arises. Regarding other configurations as well, the embodiments disclosed in the present specification are merely illustrative in all respects. Accordingly, various improvements can be made as appropriate without departing from the gist of the present disclosure.

3. Summary of Above Embodiments

The following describes a summary of the article transport facility described above.

An article transport facility is provided with a transport conveyor configured to load and transport a container storing an article to a transport location, and a weighing device installed at the transport location, in which the weighing device includes a support portion for supporting the container and a measuring portion configured to measure a weight of the container supported by the support portion, the article transport facility is configured to be able to perform a state change between a withdrawn state in which the support portion is withdrawn downward relative to a transport surface of the transport conveyor and a protruding state in which the support portion protrudes upward relative to the transport surface, by moving the support portion and the transport conveyor relative to each other in a vertical direction, and a support surface of the support portion for supporting the container is inclined such that one of a plurality of corner portions located at corners of the container is lower than the other corner portions in a view along the vertical direction.

According to this configuration, after the container is transported by the transport conveyor to the transport location, the container supported by the transport conveyor can be supported by the support portion of the weighing device by changing the relationship between the transport device and the weighing device from the withdrawn state to the protruding state. Therefore, it is possible to appropriately measure the weight of the container using the weighing device. Also, at this time, the container supported by the support portion is in an inclined orientation in which one of the multiple corner portions of the container is lower than the other corner portions. Accordingly, the bottom surface of the article stored in the container is supported by a loading portion (bottom portion) of the container or an upper surface of another article that is adjacent to the lower side thereof, and a side surface of this article on the lower side of the inclination is supported by a side wall portion of the container or a side surface of the other adjacent article, thus making the stacked state of articles stored in the container unlikely to be disrupted.

Here, it is preferable that the article transport facility further includes a receiving portion configured to come into contact with the container that has been transported by the transport conveyor and to stop the container at the transport location in a predetermined orientation.

According to this configuration, even if the orientation of the container in the view along the vertical direction transported by the transport conveyor is different from the predetermined orientation, it is possible to stop the container at the transport location in a state in which the orientation of the container is corrected to the predetermined orientation due to the container coming into contact with the receiving portion. Therefore, if a state change is performed from the withdrawn state to the protruding state, the container is unlikely to be supported by the support portion in a state in which the orientation of the container is different from the predetermined orientation.

Also, it is preferable that a state is passed through in which the transport surface and the support surface are located on the same plane while a state change is performed between the withdrawn state and the protruding state.

According to this configuration, while the relative state of the transport device and weighing device is switched from the withdrawn state to the protruding state, the transport surface of the transport conveyor and the support surface of the support are located on the same plane, and the container in this state is passed from the transport conveyor to the support. Therefore, it is possible to prevent a support angle of the container from changing when passing the container from the transport conveyor to the support, and to reduce the impact on the container.

Also, it is preferable that, when a direction that is orthogonal in a view along the vertical direction with respect to the transport direction in which the transport conveyor transports the container is the width direction, one side in the width direction is the first side in the width direction, and the side opposite thereto is the second side in the width direction, the transport surface of the transport conveyor is inclined downward toward the downstream side in the transport direction, and the transport conveyor is configured to be able to change an inclination angle of the transport surface by moving an end portion of the transport surface located on the first side in the width direction, in the vertical direction relative to an end portion thereof on the second side in the width direction.

According to this configuration, when the container is transported to the transport location by the transport conveyor, the container is already in an orientation inclined in the transport direction, and thus by changing the inclination angle of the transport conveyor relative to the width direction, it is possible to appropriately pass the container to the support surface, which is inclined such that one of the corner portions of the container is lower than the other corner portions. Therefore, it is possible to suppress a change in the support angle of the container when passing the container from the transport conveyor to the support, and to reduce the impact on the container.

Also, it is preferable that the transport conveyor is a roller conveyor in which a plurality of rollers are installed along the transport direction in which the container is transported, the support portion includes a plurality of supports that are arranged side-by-side in the transport direction, and the supports are each disposed between two rollers that are adjacent to each other in the transport direction.

According to this configuration, because the supports can be disposed using multiple gaps between rollers that are formed along the transport direction, the supports that are arranged side-by-side in the transport direction can be installed at appropriate intervals according to the size of the container in the transport direction.

Also, a configuration is preferable in which, out of the plurality of supports, an upper end portion of at least one of the supports other than the supports located at two end portions in the transport direction is retractable downward relative to the support surface.

According to this configuration, if a container that is larger than the distance between the supports located at the two end portions is supported by the support portion, by retracting the upper end portion of at least one of the supports (referred to as an intermediate support hereinafter) other than those at the two end portions in the transport direction downward relative to the support surface, it is possible to prevent the intermediate support from coming into contact with the container while the container is supported by the supports located at the two end portions. Also, if a container that is smaller than the distance between the supports located at the two end portions is supported by the support portion, by positioning the upper end portion of the intermediate support at a height corresponding to the support surface, it is possible to support the container using one of the supports located at the two end portions and the intermediate support. Therefore, even if multiple types of containers having different sizes need to be supported by the supports, it is possible to stably support containers of any size.

Also, it is preferable that the article transport facility further includes a transfer robot configured to retrieve an article from the container supported by the weighing device, or store an article in the container supported by the weighing device.

According to this configuration, while the transfer robot retrieves an article from the container or stores an article in the container, the weight of the container, which changes due to the transfer, can be measured using the weighing device. Also, at this time, the container supported by the support portion of the weighing device is in an orientation inclined such that one corner portion of the container is lower than the other corner portions, and thus it is possible to make the stacked state of articles stored in the container unlikely to be disrupted.

INDUSTRIAL APPLICABILITY

The technology according to this disclosure can be used for an article transport facility provided with a transport conveyor for loading and transporting a container storing articles to a transport location, and a weighing device installed at the transport location.

DESCRIPTION OF REFERENCE SIGNS

3: Transfer robot
5: Roller
8: Corner portion
24: Weighing device
25: Receiving portion
28: Support portion
28A: Support surface
29: Support
30: Measuring portion
31: Upper end portion 34: Inclined conveyor (transport conveyor)
34A: First transport surface (transport surface)
C1: First container (container)
P1: First transport location (transport location)
W: Article
X: Transport direction
Y: Width direction
Y1: First side in width direction
Y2: Second side in width direction
Z: Vertical direction

The invention claimed is:

1. An article transport facility comprising:
a transport conveyor configured to load and transport a container storing an article to a transport location; and
a weighing device installed at the transport location;
wherein the weighing device includes a support portion for supporting the container and a measuring portion configured to measure a weight of the container supported by the support portion,
wherein the article transport facility is configured to perform a state change between a withdrawn state in which the support portion is withdrawn downward relative to a transport surface of the transport conveyor and a protruding state in which the support portion protrudes upward relative to the transport surface by moving the support portion and the transport conveyor relative to each other in a vertical direction,
wherein a support surface of the support portion for supporting the container is inclined such that one of a plurality of corner portions located at corners of the container is lower than all of the other corner portions in a view along the vertical direction,
wherein the transport conveyor is a roller conveyor in which a plurality of rollers are installed along a transport direction in which the container is transported,
wherein the support portion includes a plurality of supports that are arranged side-by-side in the transport direction, and
wherein the supports are each disposed between two rollers that are adjacent to each other in the transport direction.

2. The article transport facility according to claim 1, further comprising:
a receiving portion configured to come into contact with the container that has been transported by the transport conveyor and to stop the container at the transport location in a predetermined orientation.

3. The article transport facility according to claim 1,
wherein a state is passed through in which the transport surface and the support surface are located on the same plane while a state change is performed between the withdrawn state and the protruding state.

4. The article transport facility according to claim 1,
wherein, when a direction that is orthogonal in the view along the vertical direction with respect to a transport direction in which the transport conveyor transports the container is a width direction, one side in the width direction is a first side in the width direction, and a side opposite thereto is a second side in the width direction,
wherein the transport surface of the transport conveyor is inclined downward toward a downstream side in the transport direction, and
wherein the transport conveyor is configured to change an inclination angle of the transport surface relative to the width direction by moving an end portion of the transport surface located on the first side in the width direction, in the vertical direction relative to an end portion thereof on the second side in the width direction.

5. The article transport facility according to claim 1,
wherein, out of the plurality of supports, an upper end portion of at least one of the supports other than the supports located at two end portions in the transport direction is retractable downward relative to the support surface.

6. The article transport facility according to claim 1, further comprising:
a transfer robot configured to retrieve an article from the container supported by the weighing device, or store an article in the container supported by the weighing device.

7. The article transport facility according to claim 2,
wherein a state is passed through in which the transport surface and the support surface are located on the same plane while a state change is performed between the withdrawn state and the protruding state.

8. The article transport facility according to claim 2,
wherein, when a direction that is orthogonal in the view along the vertical direction with respect to a transport direction in which the transport conveyor transports the container is a width direction, one side in the width direction is a first side in the width direction, and a side opposite thereto is a second side in the width direction,
wherein the transport surface of the transport conveyor is inclined downward toward a downstream side in the transport direction, and
wherein the transport conveyor is configured to change an inclination angle of the transport surface relative to the width direction by moving an end portion of the transport surface located on the first side in the width direction, in the vertical direction relative to an end portion thereof on the second side in the width direction.

9. The article transport facility according to claim 3,
wherein, when a direction that is orthogonal in the view along the vertical direction with respect to a transport direction in which the transport conveyor transports the container is a width direction, one side in the width direction is a first side in the width direction, and a side opposite thereto is a second side in the width direction,
wherein the transport surface of the transport conveyor is inclined downward toward a downstream side in the transport direction, and
wherein the transport conveyor is configured to change an inclination angle of the transport surface relative to the width direction by moving an end portion of the transport surface located on the first side in the width direction, in the vertical direction relative to an end portion thereof on the second side in the width direction.

10. The article transport facility according to claim 2,
wherein the transport conveyor is a roller conveyor in which a plurality of rollers are installed along a transport direction in which the container is transported,
wherein the support portion includes a plurality of supports that are arranged side-by-side in the transport direction, and
wherein the supports are each disposed between two rollers that are adjacent to each other in the transport direction.

11. The article transport facility according to claim 3,
wherein the transport conveyor is a roller conveyor in which a plurality of rollers are installed along a transport direction in which the container is transported,
wherein the support portion includes a plurality of supports that are arranged side-by-side in the transport direction, and
wherein the supports are each disposed between two rollers that are adjacent to each other in the transport direction.

12. The article transport facility according to claim 4,
wherein the transport conveyor is a roller conveyor in which a plurality of rollers are installed along a transport direction in which the container is transported,
wherein the support portion includes a plurality of supports that are arranged side-by-side in the transport direction, and
wherein the supports are each disposed between two rollers that are adjacent to each other in the transport direction.

13. The article transport facility according to claim 2, further comprising:
a transfer robot configured to retrieve an article from the container supported by the weighing device, or store an article in the container supported by the weighing device.

14. The article transport facility according to claim 3, further comprising:
a transfer robot configured to retrieve an article from the container supported by the weighing device, or store an article in the container supported by the weighing device.

15. The article transport facility according to claim 4, further comprising:
a transfer robot configured to retrieve an article from the container supported by the weighing device, or store an article in the container supported by the weighing device.

16. The article transport facility according to claim 1, further comprising:
a transfer robot configured to retrieve an article from the container supported by the weighing device, or store an article in the container supported by the weighing device.

17. The article transport facility according to claim 5, further comprising:
a transfer robot configured to retrieve an article from the container supported by the weighing device, or store an article in the container supported by the weighing device.

18. The article transport facility according to claim 1, wherein the support surface is inclined downward toward a downstream side in a transport direction, in which the transport conveyor transports the container, and is inclined downward toward one side in a width direction, which is orthogonal to the transport direction in a view along the vertical direction.

19. The article transport facility according to claim 18, wherein the article transport facility performs a state change from the withdrawn state to the protruding state in response to the transport surface of the transport conveyor moving to below the support portion.

20. An article transport facility comprising:
a transport conveyor configured to load and transport a container storing an article to a transport location; and
a weighing device installed at the transport location;
wherein the weighing device includes a support portion for supporting the container and a measuring portion configured to measure a weight of the container supported by the support portion,
wherein the article transport facility is configured to perform a state change between a withdrawn state in which the support portion is withdrawn downward relative to a transport surface of the transport conveyor and a protruding state in which the support portion protrudes upward relative to the transport surface by moving the support portion and the transport conveyor relative to each other in a vertical direction,
wherein a support surface of the support portion for supporting the container is inclined such that one of a plurality of corner portions located at corners of the container is lower than all of the other corner portions in a view along the vertical direction,
wherein, when a direction that is orthogonal in the view along the vertical direction with respect to a transport direction in which the transport conveyor transports the container is a width direction, one side in the width direction is a first side in the width direction, and a side opposite thereto is a second side in the width direction,
wherein the transport surface of the transport conveyor is inclined downward toward a downstream side in the transport direction,
wherein the transport conveyor is configured to change an inclination angle of the transport surface relative to the width direction by moving an end portion of the transport surface located on the first side in the width direction, in the vertical direction relative to an end portion thereof on the second side in the width direction,
wherein the transport conveyor comprises:
a base portion;
a conveyor portion having the transport surface and supported by the base portion swingably around an axial center extending along the transport direction; and
a raising and lowering device configured to raise and lower the conveyor portion by swinging the conveyor portion around the axial center,
wherein the raising and lowering device swings the conveyor portion around the axial center to raise and lower the end portion of the transport surface on the first side in the width direction relative to the end portion of the transport surface on the second side in the width direction, and
wherein the raising and lowering device swings the conveyor portion downward to cause the support portion to enter the protruding state and upward to cause the support portion to enter the withdrawn state.

21. An article transport facility comprising:
a transport conveyor configured to load and transport a container storing an article to a transport location; and
a weighing device installed at the transport location;
wherein the weighing device includes a support portion for supporting the container and a measuring portion configured to measure a weight of the container supported by the support portion,
wherein the article transport facility is configured to be able to perform a state change between a withdrawn state in which the support portion is withdrawn downward relative to a transport surface of the transport conveyor and a protruding state in which the support portion protrudes upward relative to the transport surface, by moving the support portion and the transport conveyor relative to each other in a vertical direction, wherein a support surface of the support portion for supporting the container is inclined such that one of a plurality of corner portions located at corners of the container is lower than the other corner portions in a view along the vertical direction, wherein the transport conveyor is a roller conveyor in which a plurality of rollers are installed along a transport direction in which the container is transported, wherein the support portion includes a plurality of supports that are arranged side-by-side in the transport direction, and wherein the supports are each disposed between two rollers that are adjacent to each other in the transport direction.

* * * * *